United States Patent

[11] 3,583,776

[72] Inventor Earl C. Kuhn
Verona, Pa.
[21] Appl. No. 874,753
[22] Filed Nov. 7, 1969
[45] Patented June 8, 1971
[73] Assignee Westinghouse Electric Corporation
Pittsburgh, Pa.

[54] FORCED-COOLED BEARING
6 Claims, 8 Drawing Figs.
[52] U.S. Cl. .................................. 308/160
[51] Int. Cl. .................................. F16c 17/06
[50] Field of Search .................................. 308/160,
168, 172, 73

[56] References Cited
UNITED STATES PATENTS
1,825,519  9/1931  Gordon .................. 308/160

*Primary Examiner*—Fred C. Mattern, Jr.
*Assistant Examiner*—Frank Susko
*Attorneys*—F. Shapoe, C. L. Menzemer and G. H. Telfer ABSTRACT: A bearing capable of carrying heavy loads, such as a thrust bearing or a journal bearing for large electric generators, is provided wherein each bearing pad or shoe has passages for flow of a coolant through a portion near the bearing surface with a medium in contact with the remainder of the pad having a controlled temperature in relation to the inlet coolant temperature so that essentially no thermal gradient exists across the bulk of the pad and thermal distortion is avoided in operation.

PATENTED JUN 8 1971 3,583,776

INVENTOR
Earl C. Kuhn
BY Gordon H. Telfer
ATTORNEY

3,583,776

FORCED-COOLED BEARING

BACKGROUND OF THE INVENTION

Field of the Invention

This invention relates to bearings and particularly to heavy-duty thrust bearings and journal bearings with means for forced cooling.

Description of the Prior Art

A thrust bearing generally comprises a plurality of bearing pads circumferentially arranged about the axis of rotation and having a bearing surface on which the runner travels. The pads are often pivotally disposed to assist in maintaining a satisfactory wedge-shaped oil film between the bearing surface and the moving runner. The pads are normally located in a pot of the lubricating oil. The loads that can be sustained by thrust bearings are limited by the value of the oil film thickness on the bearing surface and the temperature rise of the lubricant. With high film temperatures, the lubricant viscosity changes and the load capacity of the bearing decreases for a given value of film thickness. Increased heat flow from the film transversely through the bearing pad occurs in operation. This heat flow causes thermal gradients in the pad and produces convex distortion in the bearing surface. The distortion from a plane surface further reduces the load capacity of the bearing. Similar considerations apply to heavy-duty journal bearings in which a certain curvature in the bearing surface is desired to be maintained.

It has been recognized that some benefit can be achieved by having a coolant flow through the bearing pad near the bearing surface. There have been proposals to introduce the lubricating oil itself as the coolant in the bearing pad U.S. Pat. No. 2,955,003 is an example of such prior art. To be effective for large, heavily loaded thrust bearings, such a scheme requires transfer of impractical volumes of oil through the pad because lubricants are not very effective heat transfer agents and the temperature of the oil in the pot will tend to rise in operation. If, on the other hand, a separate coolant such as water is used it is subject to temperature variations in any practical arrangement that may still result in thermal gradients across the bearing pad.

Rotating apparatus such as water wheel electric generators are being required of larger weight and generating capacity. Merely enlarging the bearing surface area is not generally sufficient for reliable operation and the need exists for more effective cooling of the bearing pads for high loads per unit area such as up to 1,000 pounds per square inch or more.

SUMMARY OF THE INVENTION

Among the objects of the present invention is to provide bearings with improved load capacity without being subject to thermal distortion. This and other objects of the invention are achieved in a bearing wherein each bearing segment or pad is provided with forced cooling through passages in a portion near the bearing surface. This first portion of the pad is supported by a second portion that is substantially more massive and thicker. The second portion is in a medium such as the lubricant used to lubricate the bearing surface and means are provided to control the temperature of that medium so that within predetermined limits there exists a difference between the temperature of the medium and the temperature of the coolant introduced within the passages and no appreciable thermal gradient exists across the second portion of the bearing pad.

In one form of the invention, the first portion of the bearing pad is of a material with good thermal conductivity and good corrosion resistance, such as copper, while the second portion is of a relatively strong material, such as steel, and has a thickness several times that of the copper portion. The coolant through the first portion of the pad may be water. The relationship between the temperatures of the water and the oil bath can be controlled by temperature sensors in each that provide signals to a thermostatically controlled solenoid that opens and closes a cooling coil within the oil bath that may carry the same coolant as that within the shoe. Other means for temperature control may be employed. The purpose is to control the temperature of the oil bath to within predetermined limits of a prescribed difference from that of the coolant, regardless of substantial variations in the coolant temperature, so that essentially no temperature difference exists across the steel portion of the pad and the bearing will reliably operate without thermal distortion.

DESCRIPTION OF THE PREFERRED EMBODIMENTS

While generally applicable to large bearings (e.g., thrust or journal bearings), the invention will be particularly described with reference to thrust bearings.

Figure 1:
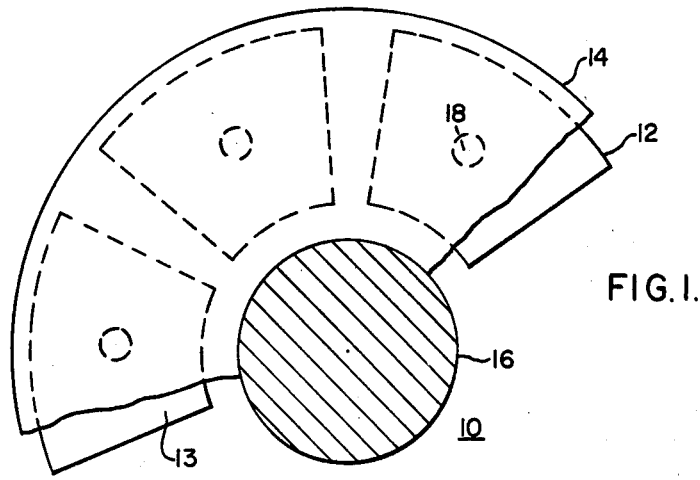
FIG. 1 is a generalized plan view of a portion of a thrust bearing, partly in section, that may embody the present invention.
Figure 2:
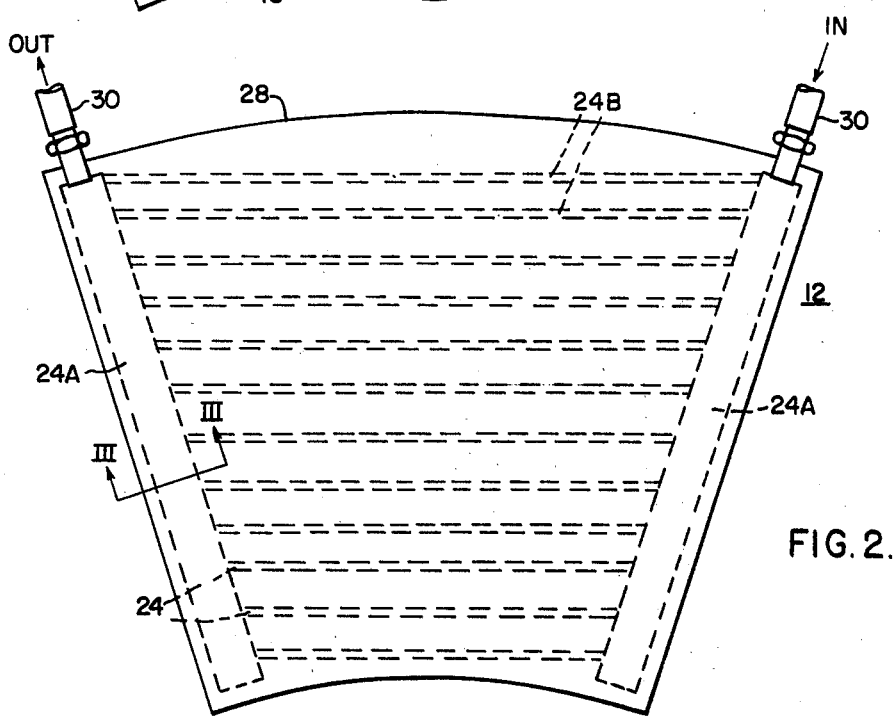
FIG. 2 is a plan view of a single bearing pad suitable for use in the bearing of FIG. 1.

Referring to FIG. 1 a thrust bearing of the type with which the invention may be practiced is shown comprising a plurality of circumferentially spaced segmental pads 12 having bearing surfaces 13 for cooperation with a rotating thrust runner or collar 14 which is fixed to a central shaft 16. The runner 14 forms an annular structure about the shaft and the individual pads 12 together form a similar annular, but interrupted, structure about the shaft 16. As is usual in such bearings, each pad 12 is supported on a pivot means 18 that may be centrally positioned as shown or otherwise located. In some bearings there may be nonpivotal shoes as in the case of fixed-pad designs.

FIGS. 2 to 5 illustrate structural details of a form of bearing pad 12 that may comprise each of the bearing pads in the arrangement of FIG. 1. First and second bearing pad portions 20 and 22 are vertically disposed with the first section 20 having a plurality of passages 24 for the flow of coolant therethrough. The second bearing pad portion 22 supports the first portion 20. The use of two such bearing pad portions 20 and 22 permits selection of different materials in accordance with their respective functions. The first portion 20 near the bearing surface 13 and carrying the coolant is preferably of a material such as copper with high thermal conductivity and good corrosion resistance against coolants such as water. The second bearing pad portion 22 is preferably of a stronger material such as steel to provide greater rigidity throughout the bearing pad 12. The copper portion 20 is shown as formed of two sections 20A and 20B so that they may be cast and brazed together. The passages 24 formed therein when sections 20A and 20B are assembled are totally enclosed by the copper. The lower section 20A of copper is preferably thin.

The bearing surface 13 is shown coated with a layer 26 of babbitt metal or the like although the use of such material is considered optional and may not be necessary in hydrodynamic systems in which an oil film is established on the surface 13 prior to initiating rotation of the moving member 14. Improved heat transfer would result if metal layer 26 is omitted.

In this embodiment the two copper sections 20A and 20B are brazed together and the lower copper section 20A is brazed to the steel portion 22 although as will be subsequently described other means for joining the copper and steel members may be employed.

Figure 4:
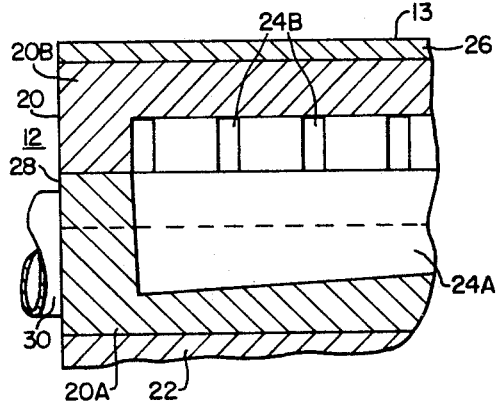
FIG. 4 is a partial sectional view taken along the line IV-IV of FIG. 3.

The copper portion 20 has inlet and outlet coolant passageways 24A extending along or near the radially extending edges of the pad 12. Between the inlet and outlet passageways are a plurality of intermediate passageways 24B each connected to the inlet and outlet passageways 24A and, in this example, arranged parallel to each other. As shown in FIG. 4, the inlet and outlet passageways 24A are each tapered downward (i.e., have a gradually diminishing cross-sectional area) from radially outward surface 28 at which the inlet and outlet ports 30 are provided while the intermediate passages 24 are of uniform cross section. The plurality of paths through the pad 12 provide means for movement of a substantial flow of coolant therethrough while the tapering of the inlet and outlet passages 24A provides a substantially uniform rate of flow through each of the passages 24B for uniform cooling throughout the pad 12.

The coolant inlet 30 is preferably at the edge of the pad 12 which is last traversed by a point on the runner, especially where there is a significant rise in coolant temperature between the inlet and outlet. Otherwise the location of the inlet and outlet in relation to runner motion is not important.

Figure 5:
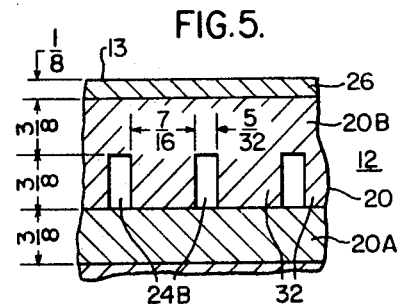
FIG. 5 is a partial sectional view taken along the line V-V of FIG. 3.

The uniform cross-sectional configuration of passages 24B, illustrated in FIGS. 4 and 5, is also important because it is a configuration that permits calculation with a high degree of accuracy the heat transfer characteristics of the structure. What occurs is essentially a plurality of copper fins 32 for conducting heat away from the bearing surface 13. If the coolant flowing through the passageways 24B between the fins 32 removes sufficient heat that the temperature at the fin extremities (at the interface between copper sections 20A and 20B) is the same as that of the remote surface 34 of the steel portion 22 of the pad, that is, if no thermal gradient exists between the extremities of the fins and the remote surface of the pad, then the pad 12 is not subject to thermal distortion. In accordance with this invention, these conditions can be satisfied. The apparatus designer may choose either to construct the fins in order to meet given temperature conditions or for a given fin construction the necessary temperatures to avoid a thermal gradient may be determined. The following is an example of such calculations and their basis:

It can be shown that for structures in accordance with this invention, satisfaction of the following equation results in no thermal gradient in the second portion 22 of the pad 12:

(1)
$$\frac{q^\circ}{t_p - t_c} = 2Hl' \cosh(Nl) + \left(kWN + \frac{hN}{2}l'^2\right) \sinh(Nl)$$

where
$q^\circ$ = bearing surface heat loss, watts/lineal in. of fin
$t_p$ = temperature of oil bath, °C.
$t_c$ = temperature of coolant at inlet, °C.
$h$ = heat transfer coefficient from the metal fin to the coolant, watts/in.² °C.
$k$ = thermal conductivity of metal fin, watts/in. °C.
$W$ = fin width (parallel to bearing surface), in.
$l$ = fin length, in.
$l'$ = width of coolant passage, in.

$$N = \sqrt{\frac{2h}{kW}}$$

The hydrodynamic losses of the bearing and hence $q^\circ$ are known to the bearing designer and, for purposes of example, the hydrodynamic losses are 45 watts/in.² of shoe surface. The quantity of cooling water specified in a prototype design is 12.5 gpm./shoe to remove all the heat with negligible temperature rise of the water. For the rectangular passage 0.375 in. by 0,156 in., (see example dimensions in FIG. 5) the water velocity is 35.7 in./sec. and the heat transfer coefficient calculates to be (2) $h = 0.75\ V^{0.31} = 0.75 \times 3.02 = 2.26$ watts/in.² C.

and the parameter $N$ is (3) $N = \sqrt{\frac{2 \times 2.26}{9.86 \times 0.4375}} = 1.023$ per in.

With the value of $Nl = 1.023 \times 0.375 = 0.3836$, the values sinh $(Nl)$ and cosh $(Nl)$ are found to be 0.39297 and 1.07449, respectively.

The other terms needed to complete the right-hand side of equation (1) are known from the geometry of the fin and the right-hand side of that equation becomes equal to 2.509 watts/in. C. Then, one calculates, (4)
$$t_p - t_c = \frac{q^\circ}{2.509} = \frac{45(W + l')}{2.509} = \frac{45 \times 0.594}{2.509} = 10.65°\ C.$$

This means that as long as this temperature difference is maintained there will be no thermal gradient in the steel portion of the thrust bearing shoe. The temperature of the coolant is permitted some variation in temperature as would be expected with seasonal changes in lake and river water.

Figure 6:
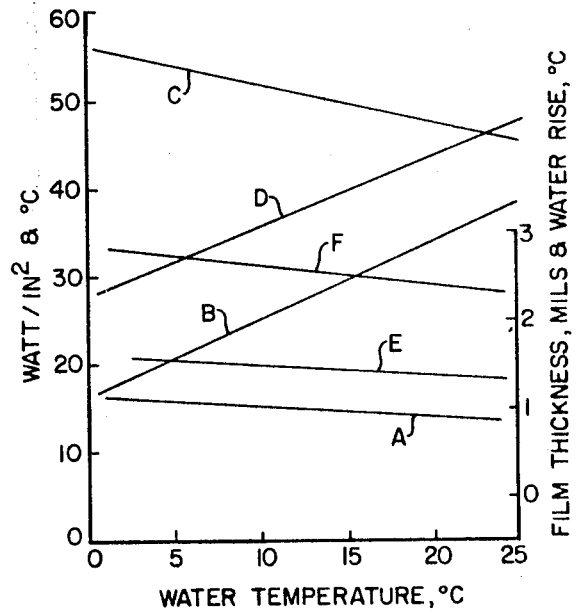
FIG. 6 is a set of curves useful in applying and understanding the invention.

The calculations may be generalized and plotted as shown in FIG. 6 so that for a given design bearing, the required temperature difference between the pot oil (300 SSU oil) and the coolant (water) can be seen for a range of water temperatures. Curve A shows a relatively constant difference (about 13° C. to 16° C.) for water temperatures of nearly 0° C. to 25° C. The requisite pot oil temperature is shown in curve B. This set of curves also shows how other qualities vary with water temperature:

Curve C____ Bearing loss, watts/in.².
Curve D____ Bearing surface temperature, ° C.
Curve E____ Oil film thickness, mils.
Curve F____ Water temperature rise (inlet-outlet difference), ° C.

The basis for the thermal analysis of bearings is well established in the literature; see, for example, an article by the present inventor titled "Load Capacity and Losses in the Infinite Slider Bearing with a Transversely Forced-Cooled Lubricant Film," *American Society of Lubrication Engineers Transactions*, V. 12, No. 2, Apr., 1969.

Figure 7:
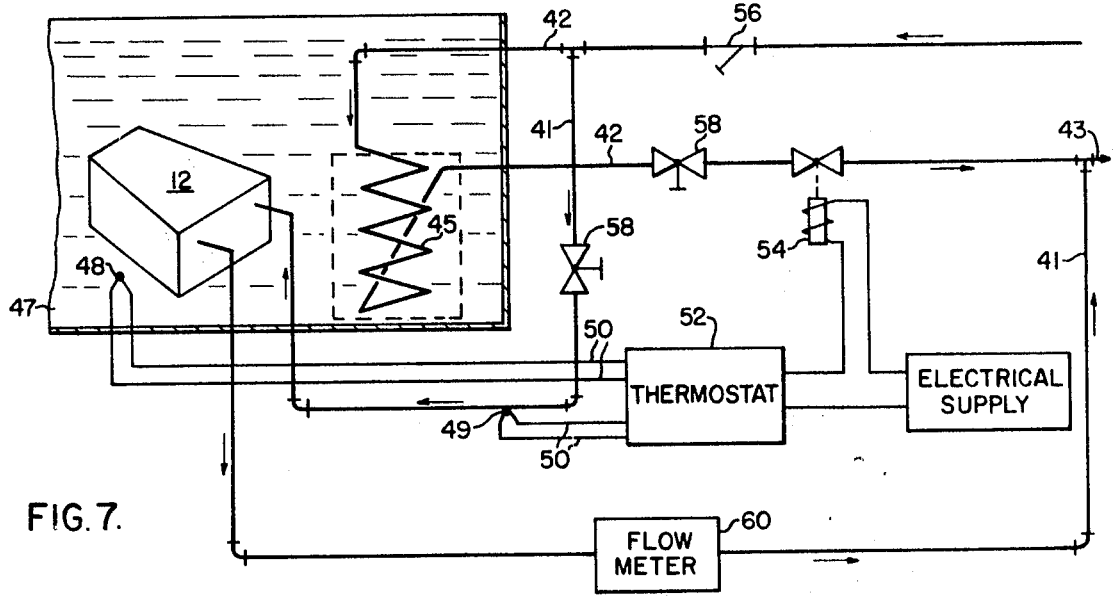
FIG. 7 is a schematic diagram of the cooling system for bearing pads in accordance with this invention.

In order to provide the necessary temperature difference there must be provided means to modify the temperature of one of the elements of the system, most conveniently the temperature of the oil within which the pad is disposed. FIG. 7 schematically illustrates such a system for water-cooled bearings. Incoming water flows through a line 40 that separates into two paths 41 and 42. The main path 41 leads through the bearing pad 12 and thence to the discharge port 43. Another path 42 is provided through a cooling coil 45 in the oil pot 47 in which the bearing shoe 12 operates. Temperature sensors 48 and 49, such as thermocouples, are provided in the oil pot and in the coolant before it is introduced into the pad. These sensors are electrically connected in this example by conductors 50 to a thermostat 52 which controls a solenoid valve 54. The valve 54 may be normally closed so that there is no flow of coolant through the cooling coil 45 in the oil pot 47. However, upon the occurrence of a temperature difference, as indicated by the sensors 48 and 49 at the thermostat 52, that is greater than a preset magnitude an electrical signal is provided to the solenoid 54 to open it and cause flow through the cooling coil 45 until the temperature difference is within the limits at which time such flow is terminated. Additional elements shown include a strainer 56 on the main incoming waterline, valves 58 on each of the main and secondary lines for manual operation, and a flowmeter 60 to indicate the quantity of flow through the waterline. The flowmeter may have associated with it alarms for indicating insufficient or excess flow.

The apparatus shown in FIG. 7 is merely by way of example. Numerous other means may be employed for temperature sensing and changing the oil temperature (or temperature of whatever medium is used). The oil pot, or equivalent element, may be provided with a heater (for use, for example, if unusually warm water or other coolant is used). Also, the cooling of the oil may be by a gradual variation of quantity of flow of coolant through coil 45 rather than merely turning on and off that flow.

Figure 8:
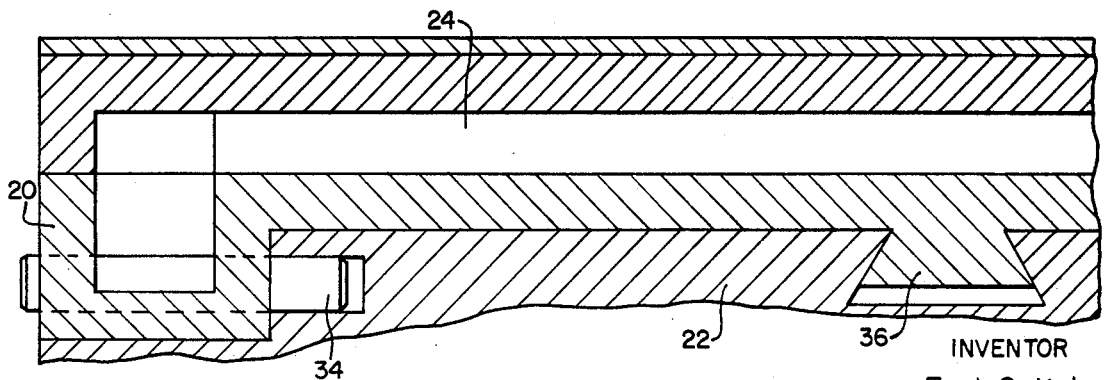
FIG. 8 is a partial sectional view of a bearing pad in accordance with an alternative embodiment of this invention.
Figure 3:
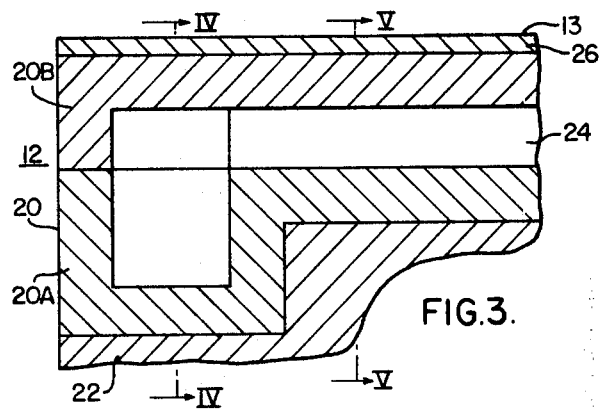
FIG. 3 is a partial sectional view taken along the line III-III of FIG. 2.

Copper and most steels have different thermal coefficients of expansion so that there is a tendency for some differential expansion. Certain stainless steels are close to copper in coefficient but are generally too expensive for use in large bearings. The greater mass and rigidity of the steel portion 22 and the improved cooling scheme of this invention avoid any excessive distortion of the bearing surface. If desired, however, the thermal mismatch can be avoided as shown in FIG. 8. Here the copper portion 20 is not brazed or otherwise fixed to the steel portion 22 but rather is joined by means permitting lateral movement therebetween such as pin 34 extending parallel to the interface loosely through the copper into the steel. Also shown is a tongue and groove type of joint 36.

While the invention has been shown and described in a few forms only it will be apparent that a number of changes may be made without departing from its true scope.

I claim:

1. A forced-cooled bearing comprising: at least one bearing pad having a bearing surface and comprising first and second portions of which said first portion is closer to said bearing surface and has passages for flow of a coolant therethrough and said second portion supports said first portion; a medium in contact with said second portion at least at a surface opposite said bearing surface; and means to control the temperature difference between the temperature of said coolant as introduced in said passages and the temperature of said medium to provide a uniform temperature transversely through said second portion.

2. The subject matter of claim 1 wherein: said first portion is thinner and has higher thermal conductivity than said second portion; said coolant and said medium are fluids of different compositions; and said means to control the temperature difference comprises first means for sensing said temperature of said coolant, second means for sensing said temperature of said medium, and means responsive to said temperatures to modify selectively the temperature of said medium.

3. The subject matter of claim 2 wherein: said first portion is of copper and said second portion is of steel.

4. The subject matter of claim 2 wherein: said coolant is water and said medium is an oil which also serves to lubricate the bearing surface.

5. The subject matter of claim 1 wherein: said passages for coolant in said first section include an inlet passage, an outlet passage, and a plurality of intermediate passages of uniform cross section each interconnecting said inlet and outlet passages; said inlet and outlet passages being tapered and having diminishing cross section away from coolant inlet and outlet points.

6. The subject matter of claim 2 wherein: said means responsive to said temperatures to modify selectively the temperature of said medium comprises a cooling coil within said medium, said cooling coil carrying the same coolant as that in said coolant passages, and further comprising means producing an electrical signal in response to said temperatures to open and close a valve in a line from a supply to said cooling coil.